UNITED STATES PATENT OFFICE.

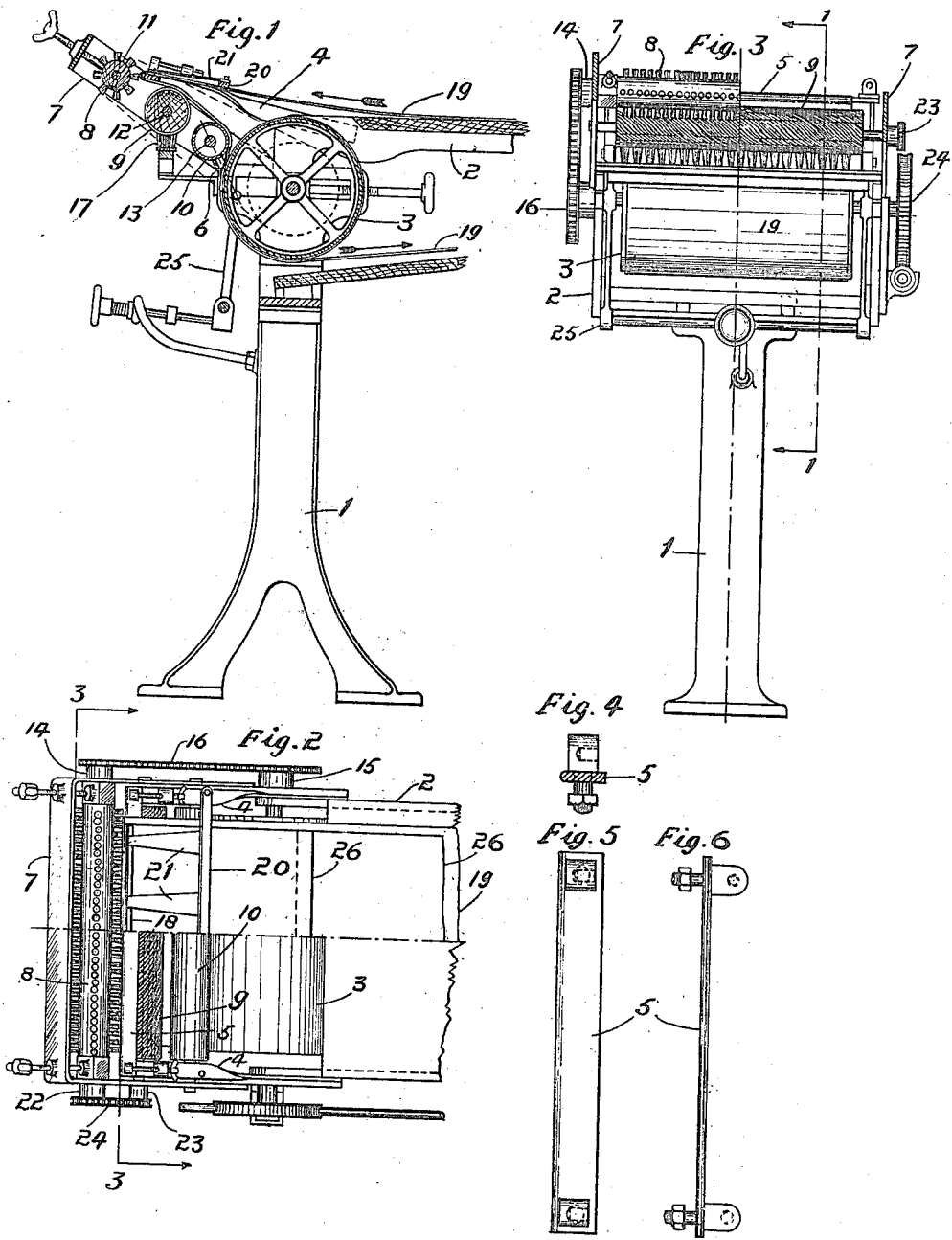

OTIS EMERSON DUNHAM, OF BEVERLY, MASSACHUSETTS.

WAXED-PAPER-CLEANING MECHANISM FOR CONFECTIONERY-MACHINES.

1,238,897.  Specification of Letters Patent.  Patented Sept. 4, 1917.

Application filed May 9, 1917. Serial No. 167,577.

*To all whom it may concern:*

Be it known that I, OTIS EMERSON DUNHAM, a citizen of the United States, residing at Beverly, in the county of Essex and State of Massachusetts, have invented a new and useful Waxed-Paper-Cleaning Mechanism for Confectionery-Machines, of which the following is a specification.

In the manufacture of confectionery certain confections are coated with chocolate or other substance different from the core or center, by machines provided with endless belts for carrying long strips of waxed-paper or plaques as they are called by the trade, on which the confections after they are coated are deposited and carried away from the coating device and the said waxed-papers or plaques with the confections thereon are then removed from the said belt by employees and placed in a suitable temperature to harden. These strips of waxed-paper accumulate spots or particles of the coating material during the process of coating by the dropping thereon of the coating material in a liquid or semi-liquid state which harden and adhere to the surface thereof, and the accumulations and particles have to be removed and the waxed-papers cleaned before being used again. Heretofore the waxed-papers or plaques have been cleaned by hand or other machines after being removed from the said endless belt of the confectionery machine and before being again placed thereon.

My invention relates to improvements in confectionery machines in which rotating rollers, some of which are provided with a bristle or brush surface and some with a surface of rubber or other desired material, operate in conjunction with a revolving endless belt which, passing over a blade or plate, turns at a sharp angle; and the object of my invention is to provide means which can be attached to any confectionery machine of the class described to automatically clean waxed-papers or plaques while on the endless belt of the machine, as shown in the construction hereinafter described and claimed, it being understood that changes in the precise embodiment of the invention herein described can be made within the scope of what is claimed, as it is evident that the device can be used with any frame and endless belt as a separate machine, without departing from the spirit of the invention.

I attain this object by the mechanism illustrated in the accompanying drawing, in which—

Figure 1 is a side elevation of my invention attached to a confectionery machine; Fig. 2 is a top plan view of the same looking down on the endless belt a portion of which is broken away to show the arrangement of the rollers beneath; Fig. 3 is a vertical cross section taken on lines 3—3 of Fig. 2 looking in the direction of the arrows; Fig. 4 is a detailed cross section of the blade or plate shown in Fig. 5; Fig. 5 is a detailed plan view of the blade or plate; Fig. 6 is a detailed edge view of Fig. 5 showing the rounded or convex edge.

Similar numerals refer to similar parts throughout the several views.

The leg or standard 1, the frame 2, and the roller or drum 3, constitute the end of a confectionery machine to which the mechanism is attached. The framework supports the blade or plate 5 having a rounded or convex edge, (see Figs. 4, 5 and 6) over which the revolving endless belt passes and turns at a sharp or acute angle downward and backward in the direction of the roll or drum 3. The framework 7 also secured to the frame of the confectionery machine supports the rotary rollers 8 and 9, which are provided respectively with the shafts 11 and 12. The rotary roller 8 is adjacent to and opposite the rounded or convexed edge of the blade or plate 5, and the surface is provided with bristles or other material. Said roller rotates in a direction opposite to the movement of the said endless belt 19 and brushes against the said belt or strips of waxed-paper or plaques upon the said belt as it revolves, movement being imparted to said roller 8 by means of the sprocket-wheels 14 and 15 and the chain 16 driven by the shaft of the drum 3. The surface of the rotating roller 9 is provided with any suitable material, I prefer rubber corrugated or indented, and said roller rotates also in a direction opposite to the movement of the said endless belt scraping the said belt with which it is in contact as it revolves. A stationary brush 17 is secured to the framework 7, contiguous to the said roller 9, and brushes and cleans the said roller as it rotates. Movement is imparted to the said roller 9 by means of the sprocket-wheels 22 and 23 and chain 24 driven by the shaft 11. A roller 10 on the shaft 13 mounted on a crank 25 exerts a continuous pressure against said endless belt to keep it taut and at the same time forces the said endless belt against the roll or drum 3.

A cross-bar 20 is secured to the frame or hanger 4 in such manner that the said endless belt may pass thereunder and is provided with resilient or spring-fingers 21 secured to the ends of which is a cross-piece 18 which rests and presses upon the said endless belt 19 or upon the strips of waxed-paper or plaques 26 on the same as they pass over the said blade or plate 5 preventing the said waxed-papers or plaques from rising or lifting up as they would be inclined to do making a sharp turn.

In operation the said revolving endless belt 19 carrying the waxed-papers or plaques 26 passes over the drum 3 in the direction of the arrow to the blade or plate 5 over which it passes and turns over the rounded or convexed edge of the same downward and backward at an acute angle or sharp angular turn which causes the accumulation or particles of the coating on the waxed-papers or plaques 26, provided the said accumulations and particles are kept in a hard or brittle state, to detach themselves and fly off of the said waxed-papers or plaques or become loose so that they may be brushed off by the brush roll 8 adjacent to the rounded or convexed edge of the blade or plate 5. The said revolving endless belt passing on brings the said waxed-papers or plaques in contact with the roller 9 which rubs or scrapes the surface of the said waxed-papers or plaques and removes any accumulations or particles thereon that have escaped the brush roll 8, the said roller 9 being continually cleaned as it rotates by the stationary brush 17 and the scraper 6. The said revolving endless belt 19 is kept taut by the roller 10 which bears against the same and presses it against the roll or drum 3, it being evident if the said belt becomes slack or loose that it will not receive a proper movement from the drum 3 of the confectionery machine from which it derives its movement.

It is essential that this mechanism should be operated in a temperature that will keep the accumulations and particles in a hard or brittle state otherwise the mechanism will not produce the proper and desired result.

I claim:

1. In a plaque-cleaning machine, the combination, with an endless belt, of means for making a sharp transverse bend in said belt, forming a narrow transverse ledge, and cleaning means disposed in proximity to said ledge.

2. In a plaque-cleaning machine, the combination, with an endless belt, of means for making a sharp transverse bend in said belt, forming a narrow transverse ledge, and a cleaning-brush disposed in proximity to said ledge.

3. In a plaque-cleaning machine, the combination, with an endless belt, of means for making a sharp transverse bend in said belt, forming a narrow transverse ledge, and a brush-roller disposed in proximity to said ledge.

4. In a plaque-cleaning machine, the combination, with an endless belt, of means for making a sharp transverse bend in said belt, forming a narrow transverse ledge, cleaning means disposed in proximity to said ledge, and yielding means disposed above said belt, in proximity to said ledge, for pressing the plaques against said belt as they approach said ledge.

5. In a plaque-cleaning machine, the combination, with an endless belt, of means for making a sharp transverse bend in said belt, forming a narrow transverse ledge, cleaning means disposed in proximity to said ledge, and resiliently-yielding means disposed above said belt, in proximity to said ledge, for pressing the plaques against said belt as they approach said ledge.

6. In a plaque-cleaning machine, the combination, with an endless belt, of means for making a sharp transverse bend in said belt, forming a narrow transverse ledge, said means including an elongated member disposed transversely of said belt, said belt passing over said member and being drawn against one of the longitudinal edges thereof, whereby the ledge in the belt is formed, and cleaning means disposed in proximity to said ledge.

7. In a plaque-cleaning machine, the combination, with an endless belt, of means for making a sharp transverse bend in said belt, forming a narrow transverse ledge, said means including a plate disposed transversely of said belt, said belt passing over said plate and being drawn against one of the longitudinal edges thereof, whereby the ledge in the belt is formed, and cleaning means disposed in proximity to said ledge.

8. In a plaque-cleaning machine, the combination, with an endless belt, of means for making a sharp transverse bend in said belt, forming a narrow transverse ledge, cleaning means disposed in proximity to said ledge, and auxiliary cleaning means disposed beneath said belt and bearing thereagainst.

9. In a plaque-cleaning machine, the combination, with an endless belt, of means for making a sharp transverse bend in said belt, forming a narrow transverse ledge, cleaning means disposed in proximity to said ledge, and auxiliary cleaning means disposed beneath said belt and comprising a cleaning-roller bearing thereagainst.

10. In a plaque-cleaning machine, the combination, with an endless belt, of means for making a sharp transverse bend in said belt, forming a narrow transverse ledge, cleaning means disposed in proximity to said ledge, auxiliary cleaning means disposed beneath said belt and comprising a cleaning-roller bearing thereagainst, and a stationary brush bearing against the periphery of said cleaning-roller.

OTIS EMERSON DUNHAM.

Witnesses:
 ALICE C. CREHAN,
 CHARLES W. HUNT.